Nov. 5, 1935.  A. T. KNOERZER  2,019,711
RAISING AND LOWERING DEVICE FOR POTATO DIGGERS
Filed April 24, 1935
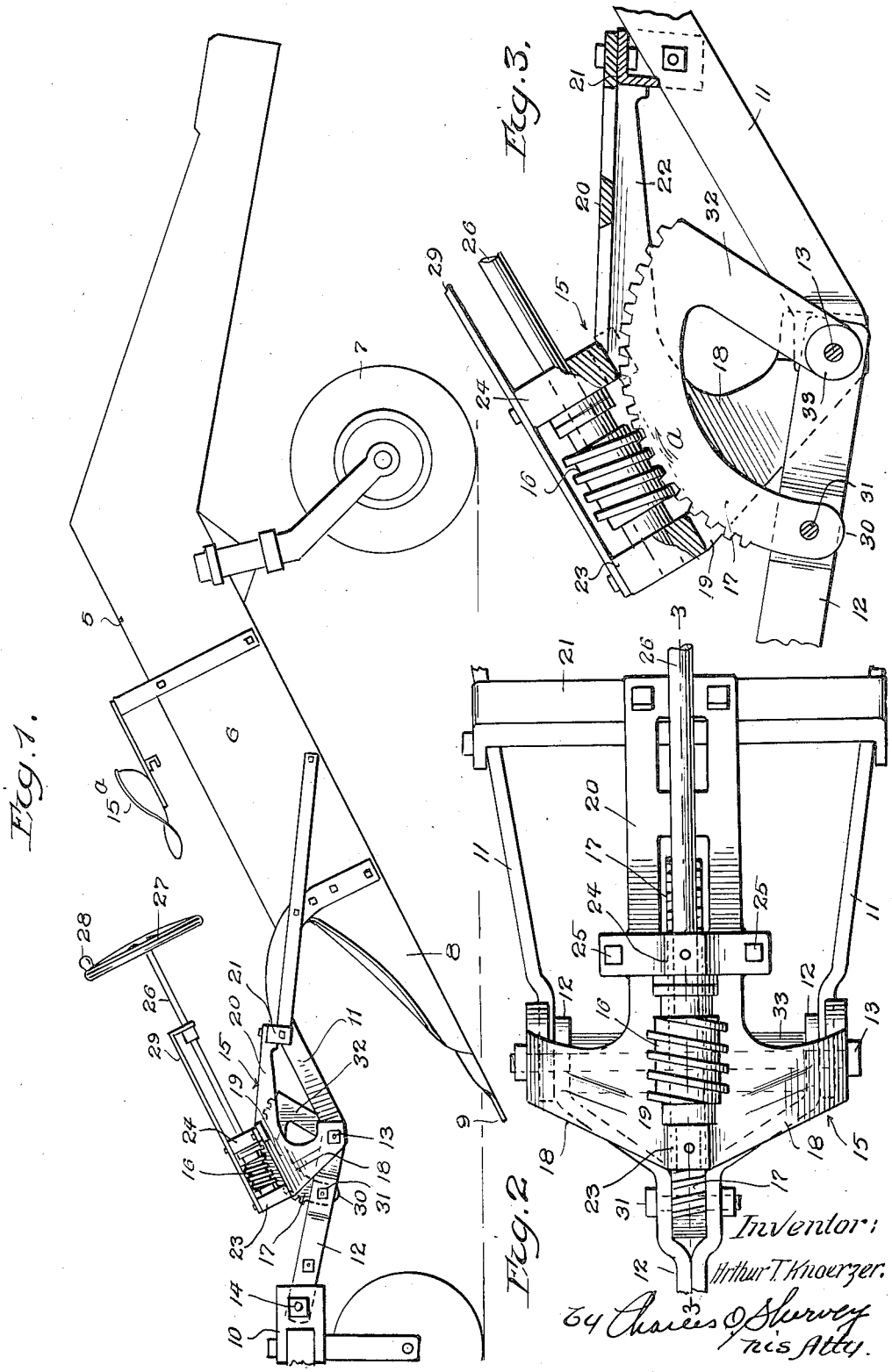

Patented Nov. 5, 1935

2,019,711

UNITED STATES PATENT OFFICE 2,019,711

RAISING AND LOWERING DEVICE FOR POTATO DIGGERS

Arthur T. Knoerzer, Hammond, Ind., assignor to Champion Corporation, Hammond, Ind., a corporation of Indiana Application April 24, 1935, Serial No. 17,947

8 Claims. (Cl. 55—137)

This invention relates to raising and lowering devices for potato diggers. One object of the invention is to provide raising and lowering means that requires less effort to raise and lower the shovel blade of diggers than heretofore. Another object is to provide raising and lowering means by means of which the shovel blade may be lowered into the ground to the exact required depth to get all of the potatoes without digging too deep and thereby dispensing with the necessity of using increased power to operate the digger. In accordance with the present invention the digging position of the shovel blade may be adjusted with great precision and with little effort on the part of the operator. Another object is to provide a self locking raising and lowering means serving to positively hold the shovel blade in adjusted position. Another object is to provide raising and lowering means which enhances the appearance of the digger thereby increasing its saleability. Another object is to provide raising and lowering means capable of use on single or double row diggers.

With these and other objects and advantages in view, this invention consists in the several novel features hereinafter fully set forth and claimed.

The invention is clearly illustrated in the drawing accompanying this specification, in which:

Fig. 1 is a side elevation of a potato digger of conventional form, stripped of much of its operating mechanism and equipped with raising and lowering means embodying a simple form of the present invention;

Fig. 2 is a detail fragmental plan of the raising and lowering means, with a certain brace bar omitted, and Fig. 3 is a detail view of said mechanism, partly in side elevation and partly in vertical longitudinal section, taken on the line 3—3 of Fig. 2.

Referring to said drawing, the reference character 5 designates a potato digger, having the usual body 6 mounted on wheels, one of which is shown at 7. At the front end of the body is the usual shovel blade 8 having a point 9 which is lowered into the ground during the digging operation and may be raised entirely above the ground when turning the digger around or moving the same from place to place.

As is customary the digger may be drawn along the ground by horses or by a tractor and for the purposes of illustration, a horse drawn sulky 10 is shown to which the digger is attached. The sulky or tractor provides a support for the front end of the digger or pair of diggers, when a double row digger is employed, and the front end of the digger may be raised or lowered about the axis of the wheels as a center as is well understood.

In accordance with the ordinary construction of diggers, a yoke, desirably in the form of arch bars 11 are bolted or otherwise secured to the sides of the body and project forward therefrom above the shovel blade. The arch bars usually converge towards their forward ends and are connected to the sulky or tractor by a bifurcated link 12 pivotally connected to the arch bars and sulky by bolts 13, 14. The link and arch bars form a toggle joint between the sulky or other support and the digger body. The angle between the link and arch bars determines the distance of the shovel blade above or below the surface of the ground. The forks of the link converge towards their forward ends and their forward extremities are usually arranged side by side and bolted together. A seat 15ª for the attendant is mounted upon the body, and when a double row digger is used, the seat usually occupies a position between the two diggers as is well understood. The digger shown is provided with the usual mechanism (not shown) for conveying the potatoes and vines through the digger body and discharging them at the rear end of the machine. The novel means for raising and lowering the shovel end of the digger will now be described. Rigidly mounted upon the arch bars is a saddle 15 in which is journaled a worm pinion 16, which meshes with a worm gear segment 17, that is rigidly connected with the link 12. The saddle 15 has two diverging arms 18 that extend downward and outward from a middle body portion 19 and straddle the front ends of the arch bars 11 to which they are connected by the bolt 13, and the body portion 19 has a centrally located brace 20 that extends backwards and downwards and is bolted to a cross bar 21 that is bolted to the arch bars. For the purposes of strength and rigidity, side flanges 22 project down from the side edges of the brace and abut against the cross bar. The forward ends of the flanges desirably merge into the arms 18, thereby providing a very rugged and substantial saddle structure.

The middle body portion 19 of the saddle desirably extends on a plane approximately parallel with the front portion of the digger body, and extending upward from said body portion 19, are two spaced lugs 23, 24 that form bearings for the worm pinion 16. The lug 24 may be separate from the saddle fastened thereto by bolts 25 for the purposes of assembling the parts.

Secured to the worm pinion and projecting back from the saddle 15 is a rod or shaft 26 upon the rear end of which is a hand wheel 27 by means of which the worm pinion is manipulated. The hand wheel 27 desirably may have a knob 28 thereon to facilitate the turning of the wheel. The wheel is located adjacent the seat in convenient position for the attendant to manipulate it.

Bolted to the bearing lugs 23, 24 and extending back, parallel with the rod 26 is a brace bar 29, the rear end of which is bent down and forms a bearing for the rod. The brace bar serves to steady the rod 26.

The worm gear segment 17 is rigid with and moves with the link 12. One end 30 of the segment is held between the forks of the link by a bolt and nut 31, and the other end of the segment has a spoke or arm 32 which extends to the bolt and is provided with a hub 33 that extends between the rear ends of the forks of the link 12 and is connected thereto by the bolt 13 that forms the pivotal connection between the arch bars 11 and the link 12.

Fig. 1 shows the shovel blade in digging position with the point entering the ground. In case it is desired to lower the blade beyond the depth shown, the hand wheel is turned in a contraclockwise direction, and to raise the blade the hand wheel is turned in a clockwise direction. By reason of the worm pinion and segment mechanism, the shovel blade may be raised or lowered to any precise point, and by giving the thread of the worm pinion a fairly steep pitch, the worm pinion and worm segment serve to lock the parts in adjusted position.

It is to be observed that the sulky or tractor forms a support for the end of the link 12 that is pivoted to it, and that the worm pinion and worm segment positively hold the link and arch bars at any angle into which they are adjusted. Turning the worm pinion in a clockwise direction, causes the worm pinion to travel along the worm segment in the direction indicated by the arrow *a* in Fig. 3, thereby widening the angle between the link 12 and the arch bars 11, thereby pressing the link down upon the sulky and raising the pivoted connection between the link and arch bars and thereby raising the digger on the axis of the wheels. The reverse action takes place when the hand wheel is turned in a contraclockwise direction.

With the present raising and lowering means there are no parts projecting down toward the web of the digger; consequently there is nothing to interfere with the free movement of the vines into the machine. Furthermore the present raising and lowering means can be substituted for the lever means now commonly in use on potato diggers for raising and lowering them.

I claim as new and desire to secure by Letters Patent:

1. Raising and lowering means for diggers, comprising a link supported at one end, and the supporting yoke of a digger, fulcrumed on the link, in combination with intermeshing toothed gears carried by the link and yoke respectively, and a hand wheel connected to one of said toothed gears.

2. Raising and lowering means for diggers, comprising a link, supported at one end, and the supporting yoke of a digger, fulcrumed on the link, in combination with a worm gear segment rigidly mounted on the link, a saddle rigidly mounted on the yoke, a worm pinion rotatively mounted in the saddle and meshing with the worm gear segment, and a hand wheel connected to said worm pinion.

3. Raising and lowering means for diggers, comprising a toggle joint connection between the digger and a support, a worm gear segment rigid with one member of the toggle joint, a worm pinion rotatively mounted upon the other member thereof and intermeshing with the worm gear segment, and a hand wheel connected to said worm pinion.

4. Raising and lowering means for diggers, comprising a link supported at one end, and the supporting yoke of a digger fulcrumed on the link, in combination with a worm gear segment rigid with the link, a saddle secured at one end to the yoke and having arms straddling the worm gear segment and fastened to the yoke, bearing lugs upstanding from said saddle, a worm pinion rotatively mounted in said lugs and meshing with said worm gear segment, a rod connected with said worm pinion, and a hand wheel on the rod.

5. Raising and lowering means for diggers, comprising a link supported at one end, and the supporting yoke of a digger fulcrumed on the link, in combination with a worm gear segment rigid with the link, a saddle secured at one end to the yoke and having arms straddling the worm gear segment and fastened to the yoke, bearing lugs upstanding from said saddle, a worm pinion rotatively mounted in said lugs and meshing with said worm gear segment, a rod connected with said worm pinion, a brace bar secured to said lugs and having an end forming a bearing for said rod, and a hand wheel on the rod.

6. Raising and lowering means for diggers, comprising a forked link supported at one end, and yoke like arch bars rigid with the body of the digger, said link and arch bars being pivotally connected together by a bolt, in combination with a worm gear segment bolted at one end to the link and having a spoke formed with a hub extending between the forks of the link with the bolt extending through the hub, a saddle having diverging arms straddling the worm gear segment and mounted on said bolt, said saddle having also a brace member supported from said arch bars, a worm pinion rotatively mounted on said saddle and meshing with said worm gear segment, and a hand wheel connected to said worm pinion.

7. The combination of a toggle joint connection between a support and a digger body, a worm gear segment rigidly secured to one member of the toggle joint, a saddle rigidly mounted on the other member, a worm pinion rotatively mounted on said saddle and meshing with the worm gear segment and a hand wheel connected to the worm pinion.

8. The combination of a wheeled support, a potato digger having a body and supporting wheels upon which the body may be tilted, a link pivotally mounted on the wheeled support, a yoke rigid with the body and fulcrumed on the link, and raising and lowering means for the body comprising intermeshing geared elements on the link and yoke respectively and a hand wheel connected to one of said geared elements.

ARTHUR T. KNOERZER.